United States Patent [19]

Lomas

[11] 4,286,800
[45] Sep. 1, 1981

[54] TRAILER

[76] Inventor: James W. Lomas, 122 Gloucester Crescent, Shoalwaterbay W.A. 6169, Australia

[21] Appl. No.: 72,995

[22] Filed: Sep. 6, 1979

[51] Int. Cl.³ ............................................. B60P 3/10
[52] U.S. Cl. ........................... 280/414 B; 280/47.24; 280/652; 414/469; 414/471; 414/490; 414/495
[58] Field of Search .............. 280/414 B, 414 R, 652, 280/47.24; 414/490, 495, 469, 471

[56] References Cited

U.S. PATENT DOCUMENTS

| 2,905,481 | 9/1959 | Schramm | 414/495 |
| 2,959,311 | 11/1960 | Rosenow | 414/495 |
| 3,424,489 | 1/1969 | Hoy | 414/495 |
| 3,578,190 | 5/1971 | May | 280/414 R |
| 3,878,958 | 4/1975 | Ring | 414/490 |
| 3,913,762 | 10/1975 | Alexander | 414/490 |
| 4,029,227 | 6/1977 | Martinez | 280/414 B |
| 4,114,772 | 9/1978 | Beelow | 414/495 |

FOREIGN PATENT DOCUMENTS

| 1431393 | 1/1966 | France | 280/414 B |
| 1304869 | 1/1973 | United Kingdom | 280/414 R |

Primary Examiner—John P. Silverstrim
Attorney, Agent, or Firm—Bernard, Rothwell & Brown

[57] ABSTRACT

The invention provides a trailer including a wheeled chassis which is connected to a load support frame by an articulated linkage whereby the frame can be moved vertically in relation to the chassis. A manually actuated lever enables the frame to be vertically moved between a lowered, unloading position and an upper, traveling position. The linkage enables the loading frame to be angled forwardly and downwardly in the traveling position whereby a catamaran or other load mounted thereon provides a stabilizing aero-foil effect during forward movement of the trailer.

10 Claims, 9 Drawing Figures

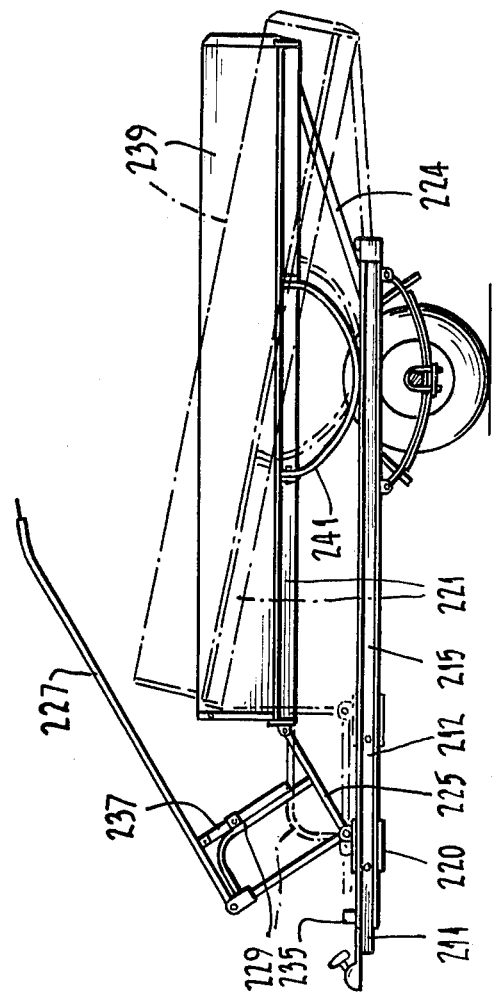

TRAILER

This invention resides in a trailer capable of moving its load supporting structure vertically to facilitate the removal or placement of a load thereon.

In one form the invention resides in a trailer construction comprising a wheeled chassis and a load support frame said wheeled chassis being connected to the support frame by an articulated linkage whereby the frame can be moved vertically in relation to the wheeled chassis, said linkage incorporating means to enable manual transposition of the frame, said means being capable of being locked in at least one position to retain the frame in a raised position in relation to the chassis.

The invention will be more fully understood in the light of the following description of two specific embodiments. The description is made with reference to the accompanying drawings of which:

FIG. 8 is a sectional elevation of the modification of the road trailer shown at FIG. 3.

Figure 1:
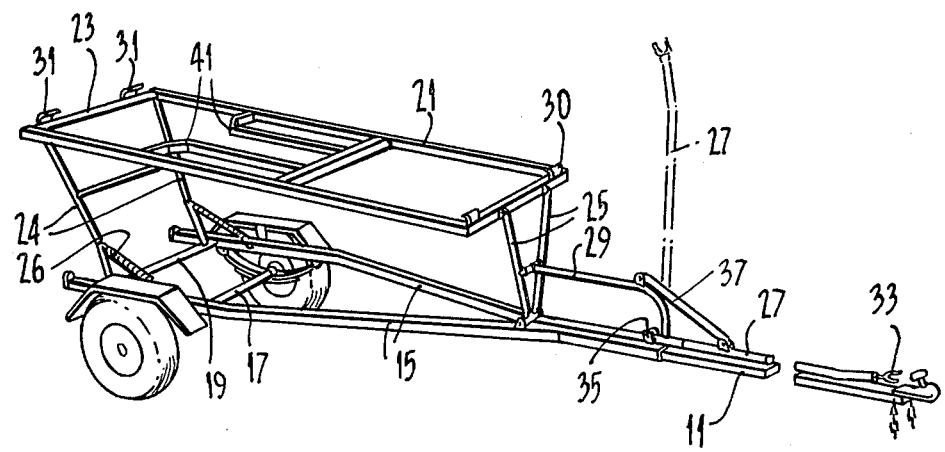
FIG. 1 is a perspective view of a road trailer in the raised catamaran transportation position.

The first embodiment comprises a road trailer which is intended to be able to support both a catamaran and a load carrying tray and has means to facilitate the loading and unloading of either component. The catamaran type which the road trailer is intended to carry, comprises a pair of spaced hulls mounted to a substantially square frame (herein after termed the trampoline frame).

The road trailer comprises a wheeled chassis and a support frame wherein the wheeled chassis consists of an extendable draw bar 11 with a suitable tow hitch fixed to its free end. The other end of the draw bar 11 is connected to a pair of diverging arms 15 supporting a wheeled axle 17 there between. Towards the free end of each arm a cross member 19 is rotatably mounted between the arms. The support frame 21 is of substantially rectangular configuration wherein the rear transverse member 23 is rotatably received in the side members of the frame. The rear transverse member 23 of the frame 21 and the cross member 19 of the chassis are rigidly interconnected by a pair of struts 24 while the front of the frame and the junction of the two arms 15 of the chassis are pivotally interconnected by a frame member 25.

The frame member 25 comprises a substantially planar triangular frame pivotally mounted at its apex to the draw bar 11 for rotation about a transverse axis and pivotally mounted at its base to the support frame 21. The frame member 25 further incorporates a hand lever 27 extending perpendicularly from its apex. A brace 29 is mounted between the frame member 25 and the hand lever 27 to provide further support to the handle. The handle 27 is articulated just above the brace to facilitate movement of the outer portion between a position where it is substantially in line with the inner portion and a position where it is substantially perpendicular to the inner portion (as shown in dotted lines in FIGS. 1 and 2). Biasing means in the form of springs 26 are provided between the struts 24 and the chassis to bias the support frame 21 to the raised position in relation to the chassis.

Figure 2:
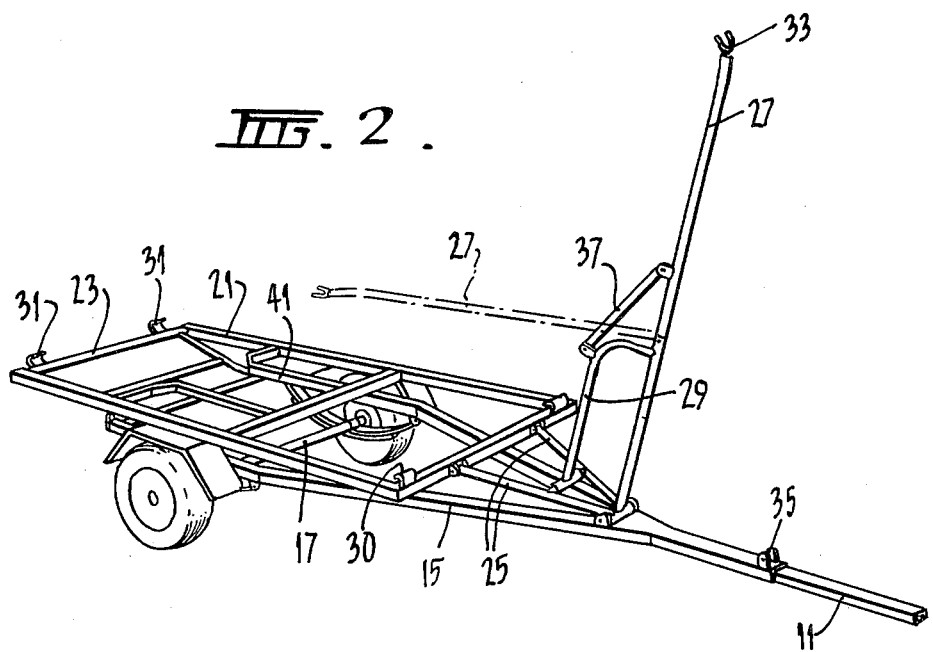
FIG. 2 is a perspective view of the road trailer of FIG. 1 in the lowered position.
Figure 5A:
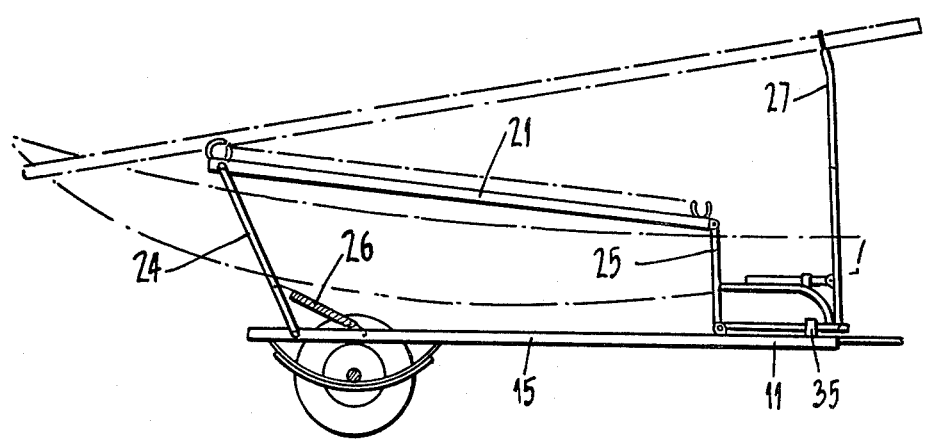
FIG. 5A and 5B are sectional elevations of the road trailer in the catamaran carrying state and the unloading state.
Figure 5B:
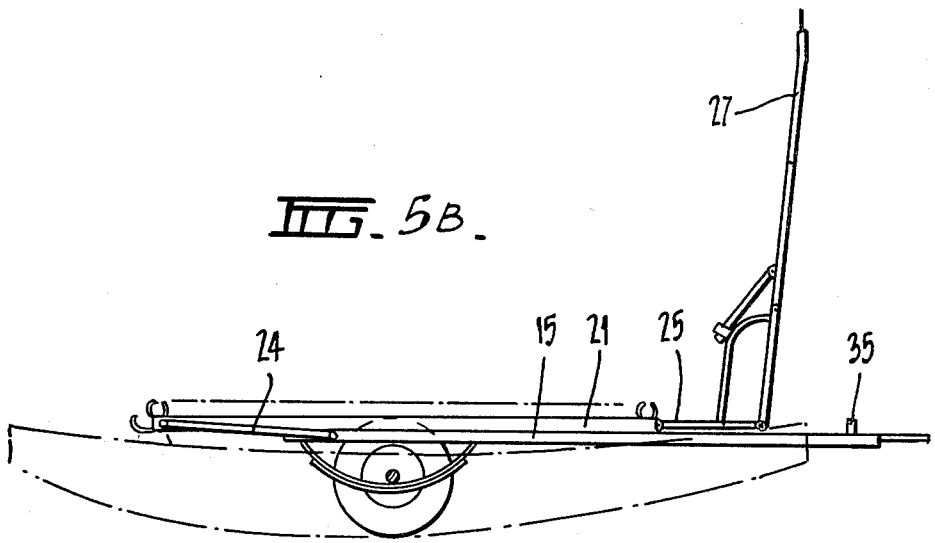

In use the vertical transposition of the hand lever 27 will cause vertical movement of the support frame 21 in relation to the chassis between the raised position shown at FIG. 1 and the lowered position shown at FIG. 2. The forward end of the support frame 21 is provided with a pair of rests 30 intended to accommodate and support the rear cross bar of the catamaran trampoline frame while the rear transverse member 23 of the support frame 21 has a pair of spaced hook members 31 which will move with rotation of the rear transverse member between a position where they retain and engage the forward cross bar of the catamaran trampoline frame when the support frame is in the raised condition, and a position where they are clear of the rear cross bar when the support frame is in the lowered condition (see FIGS. 5A and 5B). When the support frame 21 is in the raised condition the handle 27 is parallel with the draw bar but by virtue of its articulation the outer end can be raised to an upright position where the upper end 33 can engage and support the mast of the catamaran. The draw bar has mounted to it a locking means 35 which will engage the inner portion of the handle 27 when parallel with the draw bar to retain the support frame 21 in the raised position. In addition a locking means 37 is mounted between the brace 29 and the outer portion of the hand lever 27 in order that the outer portion can be retained in the in-line or perpendicular position in relation to the inner portion of the hand lever. When the support platform 21 is in its lowered position as shown at FIGS. 2 and 5B the rear transverse member 23 is clear of the catamaran which is supported by its hulls on the ground to facilitate removal of the trailer from underneath the catamaran.

Figure 3:
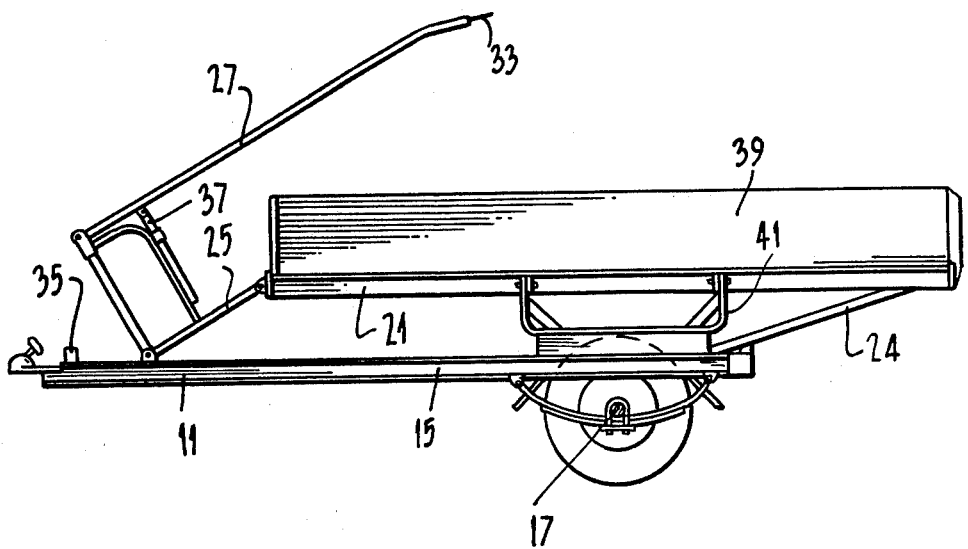
FIG. 3 is a sectional side elevation of the road trailer when supporting a load carrying tray.

The trailer may be used to carry a load support tray 39 as shown in FIG. 3. The tray 39 is of an open topped bar configuration and is accommodated on the support frame 21 to be engaged by suitable locking means (not shown). The support frame 21 has spacer frames 41 mounted to each side of it which are pivotable from a coplanar relationship with the support frame to a downwardly depending position.

Figure 4:
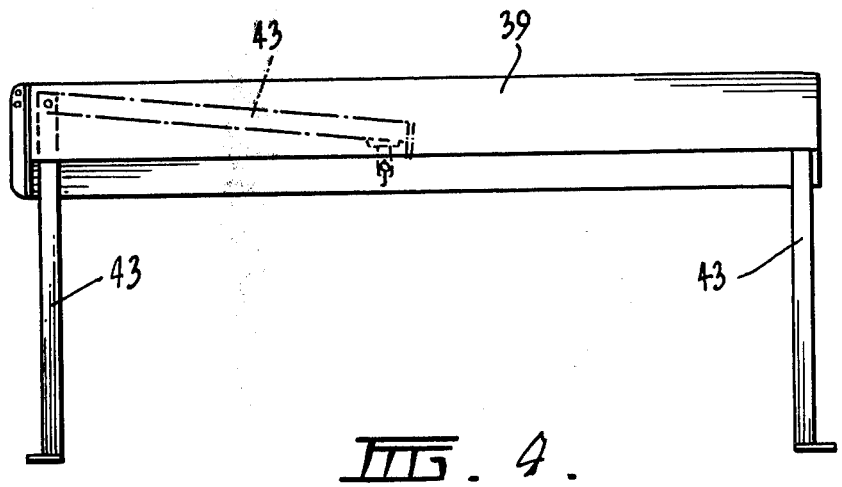
FIG. 4 is an elevation of the load carrying tray when self supporting.

When the spacer frames 41 are downwardly depending they will engage with the arms 15 of the chassis to space the support frame 21 above the chassis. The support tray as shown at FIG. 4 has support legs 43 located at each corner which enables the tray to be free standing when it is separated from the trailer. To unload the tray from the trailer the spacer frames 41 are pivoted to their coplanar position on the support frame 21 and the support frame 21 is lowered away from the underneath of the tray to allow it to be fully supported on its legs 43. The legs 43 are pivotally mounted to the side of the tray to enable them to be pivotted upwards to a position parallel with the sides of the tray and suitable locking means is provided at the sides of the tray to retain the legs in the raised position.

As a result of the first embodiment a trailer is provided which can provide a means of transporting a catamaran and a supporting tray for general purposes.

In addition the trailer may be used in association with a number of supporting trays whereby the trays can be located when separated from the trailer and the trailer can be used to remove the loaded trays and replace unloaded trays at a loading station and the reverse proceedure can be followed at an unloading station. The latter feature would be of value where small loads are involved which makes the use of a truck or separate utility vehicle uneconomic.

Figure 6:
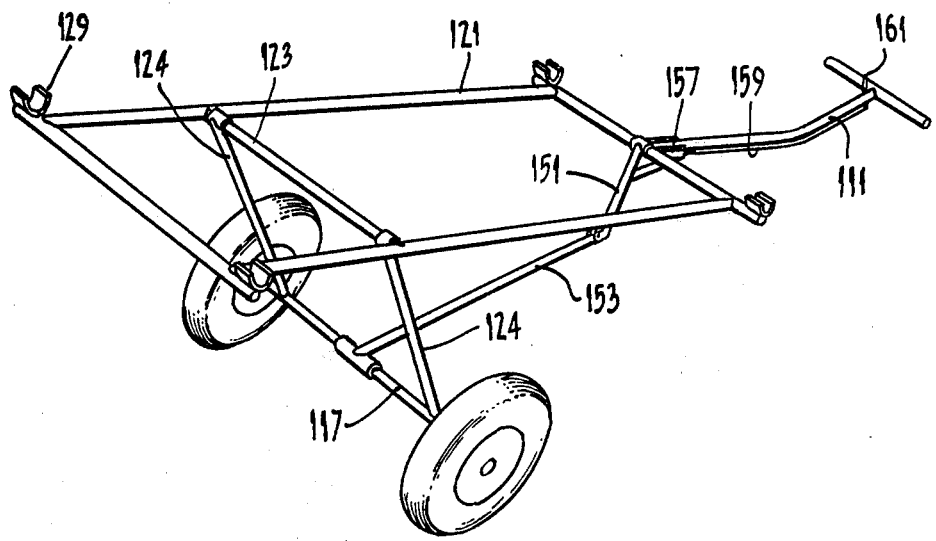
FIG. 6 is a perspective view of a hand trailer in the load supporting position.
Figure 7:
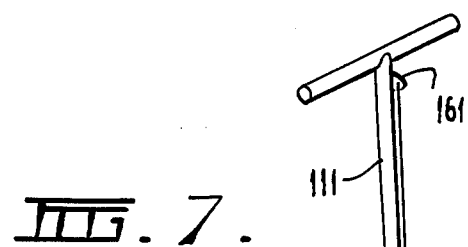
FIG. 7 is a perspective view of the hand trailer in the lowered position.
Figure 7:
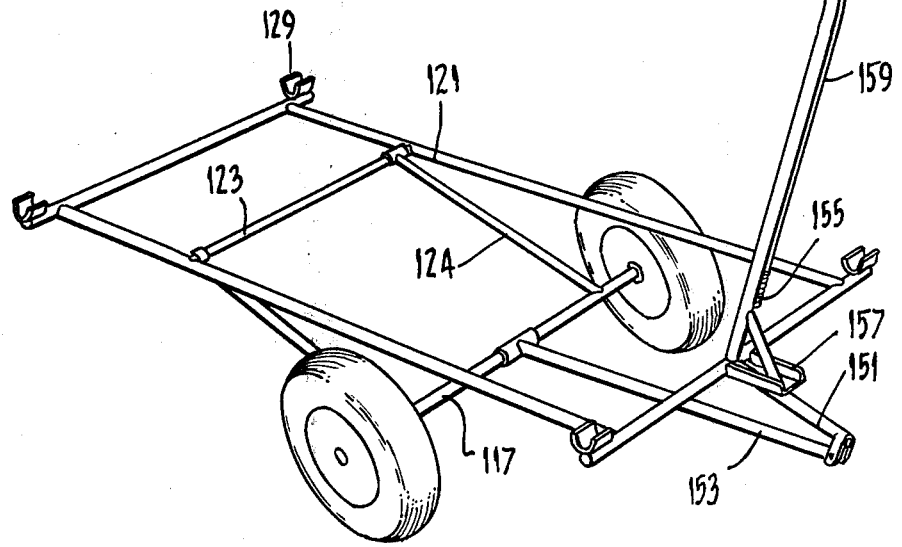

The second embodiment shown at FIG. 6 and 7 relates to a hand trailer for use in the transportation of a catamaran of the type discussed in relation to the first embodiment and to a support tray 39 of the form shown at FIG. 4.

The hand trailer comprises a chassis which consists of the axle 117 supported by a pair of wheels, and a support frame 121. A draw bar 111 is pivotally mounted to the forward end of the support frame. The draw bar 111 has mounted at its support frame end a substantially perpendicular arm 151 which depends downwardly from the frame. The outer end of the perpendicular arm is connected to the wheeled axle via a strut 153 pivotally mounted at one end to the axle 117 and at the other end to the perpendicular arm 153. The surface frame is substantially rectangular in configuration and is provided with a transverse member 123 towards its rear end. The transverse member 123 is connected to the axle 117 by a pair of spaced struts 124 fixed to the axle and pivotally mounted to the transverse member 123.

The draw bar 111 in being pivotally mounted to the support frame 121 and by virtue of its articulated connection with the wheeled axle 117 acts as a bell crank in raising or lowering the front end of the support frame 121 in relation to the wheeled axle 117. The function of the struts 124 interconnecting the axle and the support frame 121 is to produce a complementary vertical transposition of the rear of the support frame to that of the front of the frame caused by the rotation of the draw bar 111. By its pivoted connection to the support frame 121 the draw bar 111 serves the function of the hand lever 27 of the first embodiment. The draw bar has mounted to its lower surface a slidable bolt 155 which is intended to engage an abutment 157 on the support frame in order to lock the draw bar into a coplanar position with the support frame 121. The slidable bolt is biassed to its engaged position by a suitable spring and is operated via a linkage 159 by a trigger 161 located at the handle end of the draw bar 111.

The upper surface of the support frame 121 has a rest 129 located in each corner which is intended to engage and support the frame of the catamaran or alternatively the underneath of the support tray 39. To mount the catamaran or support tray onto the trailer the slidable bolt 155 is disengaged from the abutment 157 and the draw bar 111 is pivoted upwards to cause the support frame 121 to be lowered. The trailer is then pushed underneath the catamaran or free standing tray and the draw bar 111 is pivoted downwards to lift the catamaran or tray, the draw bar is locked into position and the catamaran or tray can then be readily moved. Where it may be desired to carry the catamaran on the roof of a vehicle the catamaran with the hand trailer attached can be loaded onto the vehicle in the inverted position and by this means it is ensured that the catamaran is readily transportable when off the vehicle to facilitate launching or stowage.

It is anticipated that just as the road trailer of the first embodiment can be used in association with a number of trays located at a loading and/or unloading station so the hand trailer of the second embodiment can be used at the loading and/or unloading stations for movement of the trays at the stations.

FIG. 8 illustrates a modification of the road trailer of FIG. 3 whereby a tipping function it incorporated into the trailer. The modification comprises a central longitudinal beam 212 incorporated into the wheeled chassis and located at the junction of a pair of rearwardly diverging arms 215 of the chassis. The forward end of the beam 212 slidably supports within itself a draw bar 211 having a tow hitch at its outer end to facilitate extension or retraction of the draw bar 211 as required. The chassis supports a support frame 221 by virtue of a pivoted linkage of the same form as that of the road trailer shown at FIGS. 1 to 5. However the nature of the linkage differs in that the frame member 225 which pivotally interconnects the front of the support frame 221 with the chassis is pivotally mounted to the beam 212 by a saddle which is slidably received on the beam. The support frame 221 is supported on the diverging arms 215 when in the position for carrying the load supporting tray 239 by means of a spacer frame 241 located to each side of the support frame 221 and supported by the diverging arms of the chassis. The spacer frames 241 are pivotally mounted to the underneath of the support frame 221 to facilitate their retraction when the tray 239 is being loaded or unloaded from the trailer. The lower surface of the spacer frames 241 is arcuate in longitudinal section. The saddle 220 is capable of being locked in position on the beam 211 to facilitate the functions sets out for the load trailer of FIGS. 1 to 5. On the saddle 221 being unlocked on the beam and with downward pivotal movement of the hand lever 227 the saddle will slide rearwardly on the beam 212 to cause the support frame 221 to tip rearwardly (as shown in broken lines in FIG. 8). It should be appreciated that the scope of the invention is not limited to the particular scope of the two embodiments described above. In particular the scope of the invention need not be limited to a trailer for the transportation of a catamaran and/or tray but may be adapted for use with any other load capable of being carried on a trailer.

We claim:

1. A trailer comprising a wheeled chassis and a load support frame having a rear end and a forward end, said wheeled chassis being connected to the support frame by a linkage for moving the frame vertically in relation to the wheeled chassis, wherein said linkage includes a rear strut pivotally mounted to the chassis and pivotally mounted to the rear end of the support frame, a forward strut pivotally mounted to the chassis and pivotally mounted to the forward end of the support frame, the rear strut being longer than the forward strut and the pivotal mountings of the rear strut and the forward strut to the chassis being substantially in the plane of the chassis, lever means mounted to and extending from the forward strut for moving the support frame vertically in relation to the chassis between a raised position and lowered position and locking means for locking the lever means in at least the raised position and retaining the support frame in a raised position in relation to the chassis; said rear strut and said forward strut cooperating with said frame and said chassis to maintain the pivotal mounting of the rear strut to the chassis forward of the pivotal mounting of the rear strut to the support frame between the raised and lowered positions.

2. The trailer according to claim 1 wherein said wheeled chassis includes a rear end and a forward end and said linkage for moving the frame in relation to said chassis includes said rear strut being pivotally mounted to the rear end of the chassis and the forward strut being pivotally mounted to the forward end of said chassis.

3. A trailer according to claim 2, wherein the chassis includes an elongated transverse member arranged for axial rotation and the rear strut is rigidly connected to said transverse member to provide the pivotal mounting of the rear strut to the chassis.

4. A trailer according to claim 1, wherein the chassis includes a frame, wheels supporting said frame, and a draw bar mounted to the frame, said locking means being provided on the draw bar to engage said lever means when said lever means is adjacent to the draw bar to retain the support frame in its raised position.

5. A trailer according to claim 1, wherein the trailer includes a box shaped load support tray to be supported on the support frame, said load support tray being disengageable from the support frame and having collapsible legs mounted thereto for supporting the tray when disengaged from the support frame.

6. A trailer according to claim 2, wherein the forward end of the support frame is provided with a plurality of spaced rests arranged to engage the trampoline frame of a catamaran to restrain the trampoline frame from vertical movement in relation to the support frame, the rear strut is pivotally mounted to the support frame by being rigidly connected to an elongated transverse member of the support frame which transverse member is axially rotatably mounted, a plurality of spaced hook members are mounted on the transverse member of the support frame for rotation with the transverse member to a position to retain the trampoline frame against vertical transposition on the support frame when in the raised position, and for rotation to a disengaged position in relation to the trampoline frame when said support frame is in a lowered position.

7. A trailer according to claim 1, wherein the chassis includes a wheeled axle which is axially rotatably mounted and a chassis strut extending forwardly from the axle, said chassis strut having its rearward end pivotally connected to the axle, the linkage comprises a rear strut rigidly connected to the axle and to the rear end of the support frame, and forward strut including a first arm pivotally connected to the forward end of the chassis strut and to the forward end of the support frame and the lever means including a second arm rigidly connected to the first arm to form a bell crank pivoted at its common fulcrum on the forward end of the support frame.

8. A trailer according to claim 7, wherein the lever means includes a latch member longitudinally slidable on the lever means, an abutment on the support frame, said latch member being arranged for engaging said abutment to retain the support frame in its raised position, and disengagement means at the outer end of the lever means for disengaging the latch member from the abutment.

9. A trailer according to claim 5, wherein saddle means are arranged, for sliding longitudinally on the chassis, said forward strut being pivotally on said saddle means on pivotal movement of the forward strut to effect the saddle sliding longitudinally on the chassis to produce a tipping action of the tray, and locking means is provided between the saddle means and the chassis to selectively prevent such slidable movement.

10. A trailer according to claim 1, which comprises spring means for urging the load support frame towards a raised position.

* * * * *